US008336198B2

(12) United States Patent
Tien

(10) Patent No.: US 8,336,198 B2
(45) Date of Patent: Dec. 25, 2012

(54) AUTOMATIC FEEDING AND CRIMPING DEVICE OF APPLICATOR IN TERMINAL MAKING MACHINE FOR FLEXIBLE PRINTED CIRCUITS, FLAT CABLES AND CABLE TERMINALS

(76) Inventor: Cheng Jen Tien, Taipei Hsien (TW)

( * ) Notice: Subject to any disclaimer, the term of this patent is extended or adjusted under 35 U.S.C. 154(b) by 277 days.

(21) Appl. No.: 12/915,147

(22) Filed: Oct. 29, 2010

(65) Prior Publication Data

US 2012/0102727 A1 May 3, 2012

(51) Int. Cl.
*B23P 19/00* (2006.01)
*H01R 43/042* (2006.01)

(52) U.S. Cl. ................................ 29/751; 29/753; 29/761

(58) Field of Classification Search .................... 29/751, 29/753, 761, 861, 863; 439/79, 495, 607.05, 439/620.09, 701
See application file for complete search history.

(56) References Cited

U.S. PATENT DOCUMENTS 7,059,907 B2 * 6/2006 Winings et al. .......... 439/607.05
7,509,732 B2 * 3/2009 Kumakura ...................... 29/753

* cited by examiner

*Primary Examiner* — Thiem Phan
(74) *Attorney, Agent, or Firm* — Jackson IPG PLLC

(57) ABSTRACT

An automatic feeding and crimping device of an applicator in a terminal making machine for flexible printed circuits, flat cables and cable terminals allows easy adjustment of a feed number of terminals and serves to automatically feed the terminals for the applicator to crimp the terminals with a flexible printed circuit, a flat cable or other cable terminals, thereby providing industrial benefits related to fast and precise terminal processing and flexible feed pitches.

10 Claims, 7 Drawing Sheets

AUTOMATIC FEEDING AND CRIMPING DEVICE OF APPLICATOR IN TERMINAL MAKING MACHINE FOR FLEXIBLE PRINTED CIRCUITS, FLAT CABLES AND CABLE TERMINALS

BACKGROUND OF THE INVENTION

1. Technical Field

The present invention relates to an innovate design of a feeding system of an applicator in a terminal making machine, which serves to automatically feed flexible printed circuits, flexible flat cables and so on for crimping terminals thereon.

2. Description of Related Art

A terminal crimping machine is known to combine metal terminals with stranded wire or a copper cord covered by the metal terminals in a mold so as to establish electric connection between electrode ends or signal ends of the terminals and the wire or cord.

Presently, flexible printed circuits and flexible flat cables have been widely used in electrical machinery, electronic and computer-related fields for electrodes or signal transmission. The so-called flexible printed circuit (also known as FPC) is made by coating copper foil on a flexible polyimide (PI) or polyethylene terephthalate (PET) substrate, and etching the copper foil to create a single-sided, double-sided or multi-layer circuit that is flexible, on which circuit electronic devices or press buttons may be added. Such a light and compact flexible printed circuit can be implanted into various electric and electronic apparatuses in a space-saving manner. On the other hand, the so-called flexible flat cable (also known as FFC) is made by combining an insulating material such as PET and a very thin flat tinned copper wire in a high-tech automated wire making machine into a flexible flat cable that acts as a transmission medium for electricity or signals in various electric and electronic apparatuses.

Both flexible printed circuits and flexible flat cables enjoy the advantages of softness, capacity for being bent and folded, small thickness, compactness, easy connection and disconnection, and usefulness for addressing electromagnetic interference (EMI). Therein, flexible printed circuits are suitable applications where special requirements are made to compactness or curved profiles, and may be equipped with electronic devices such as connectors, resistors, capacitors, light-emitting diodes and touch switches, in addition to circuit layouts, so as to act as electronic components with specific functions but not only connecting members. By comparison, flexible flat cables are more economical than flexible printed circuits under cost considerations, and thus are extensively used for electric connection or signal connection between various circuit boards.

For connecting with other connecting members, such a flexible printed circuit/flexible flat cable B must have its copper-foil/copper-wire connecting end B1 be crimped together with terminals A1, and have plural terminals such processed inserted into a plastic housing to form a finalized FPC/FFC assembly.

As shown in FIG. 1 and FIG. 3, in the course of fabricating the terminals, for facilitating its assembling to a copper-foil/copper-wire connecting end B1 of a flexible printed circuit, a flexible flat cable, a normal flat cable or a wire B through crimping, a continuous terminal band A is made of a metal sheet by means of a precise in-mold punching process. The continuous terminal band A has a plurality of equidistant terminals A1, pitch-setting hole A2 and band-positioning portions A3. Each said terminal A1 has one end formed with piercing legs A11 and an opposite end formed with a square-headed contacting section A12 or a U-headed contacting section A13 for connecting a male terminal. At a reverse side of the piercing legs A11 and the square-headed contacting section A12 or the U-headed contacting section A13, there is a clip A14 for engaging with a plastic housing of the resultant terminal connector. However, it is difficult to ensure the precise combination between the copper-foil/copper-wire connecting end B1 of the flexible printed circuit/flexible flat cable B and the terminals A1 through the crimping process. Currently, specialized terminal crimping machines are used for the crimping process to crimp one terminal one time.

The foregoing terminal A1 may have its contact region formed into the contact specifications of either the square-headed contacting section A12 or the U-headed contacting section A13. Therein, the square-headed contacting section A12 requires relatively large band length for forming the square frame of the contact region. In this case, for punching the continuous terminal band A, the adjacent terminals A1 are spaced by a distance D1 of 5.08 mm. On the other hand, the U-headed contacting section A13 only requires relatively small band length for forming the semicircle or U-shaped frame of the contact region. In this case, for punching the continuous terminal band A, the adjacent terminals A1 are spaced by a distance D2 of 2.54 mm. However, in practice, on the connecting end B1, an interval between two adjacent said terminals A1 is set as 2.54 mm.

Thus, clearly, when the continuous terminal band A having U-headed contacting sections A13 is to be combined with the flexible printed circuit/flexible flat cable B with the set intervals of 2.54 mm, plural abreast terminals A1 can be processed at one time. However, when the continuous terminal band A with square-headed contacting sections A12 is to be combined with the flexible printed circuit/flexible flat cable B, it is impossible to crimp plural abreast terminals A1 at the same time. For instance, to make a 13-pin assembly, the conventional crimping method is to feed the terminals with a feed pitch of 5.08 mm and otherwise feed the flexible printed circuit/flexible flat cable B with a different feed pitch of 2.54 mm. By setting the terminal making machine for a 13-pin crimping process and activating it, the terminal making machine will crimp one pin a time until the total 13 pins are finished. In such a case, the biggest concerns are the feeding accumulated error evolving through the 13-pin crimping process and high material loss (and in turn the low yield) due to jams and/or deviation of the terminals or the flexible printed circuit/flexible flat cable B. In addition, the operation is complicated and preciseness is difficult to secure. Moreover, various jigs and crimping molds are involved in the crimping process. Thus, even for crimping terminals of the same specification, several procedures with use of different jigs/molds have to be done, and consequently incur high processing costs, unstable product quality as well as very high defective rate.

In view of the above shortcomings, the inventor of the present invention has invented the disclosed device, which allows continuous terminal bands A with both square-headed contacting sections A12 and U-headed contacting sections A13 to be automatically fed and later crimped with flexible printed circuits/flexible flat cables.

SUMMARY OF THE INVENTION

The inventor of the present invention, basing on his decades of experience in terminal crimping, molding, and manufacturing, conducted long-term researches, and eventually developed an “automatic feeding and crimping device of an applicator in a terminal making machine for flexible printed circuits, flat cables and cable terminals." Therein, to perform a crimping process for continuous terminal bands A with square-headed contacting sections A12, two said continuous terminal band A and A' with terminals A spaced by 5.08 mm are offset stacked and placed in a feeding channel, so as to make two adjacent terminals A1 on respective said bands A and A' spaced by 2.54 mm, equal to the default distance of a copper-foil/copper-wire connecting end B1 of a flexible printed circuit/flexible flat cable B (for an application of 1.27 mm, terminal bands with terminals spaced by 2.54 mm are stacked offset in the same manner), and thus the abreast terminals A1 in a number between two and forty can be perfectly crimped with the copper-foil/copper-wire connecting end B1 in a single step, thereby providing advantageous of fast process, low defective rate and zero accumulated feeding error. To perform a crimping process for a continuous terminal band A with U-headed contacting sections A13 spaced by the default distance of the copper-foil/copper-wire connecting end B1, i.e. 2.54 mm, the continuous terminal band A is placed into the feeding channel, and the abreast terminals A1 in a number as desired, between two and forty, can be crimped with the copper-foil/copper-wire connecting end B1 in a single step of the flexible printed circuit/flexible flat cable B. To make products with terminals spaced by 1.27 mm, terminal bands with terminal spaced by 2.54 mm may be offset stacked the abreast terminals A1 in a number as desired, between two and forty, can be crimped with the copper-foil/copper-wire connecting end B1 in a single step of the flexible printed circuit/flexible flat cable B, so that perfect connection can be achieved in a fast, neat, low-loss and error-free manner.

The disclosed device includes a plurality of feeding pitch holes. For proceeding different numbers of the terminals A1 on a continuous terminal band A, by merely putting a feed setting post into the proper feeding pitch hole, a feeding slider is directed to automatically deliver the terminals A1 of the set number batch by batch. In addition, a plurality of spacing pins on a mold in the applicator serve to position well pitch-setting holes A2 on the continuous terminal band A before the mold is closed, so as to ensure a precise crimping process. At the end of the crimping process, a cutting means of the device serves to equidistantly cut scrap.

The disclosed device further has a band retaining hook, so that the terminals A1 of the set number being fed forward can be prevent from going back or bias. Moreover, the disclosed device is ended by a scrap chopper, which serves to chop scrap equidistantly into small pieces, for facilitating disposal and collection of the scrap.

BRIEF DESCRIPTION OF THE DRAWINGS

The invention as well as a preferred mode of use, further objectives and advantages thereof will be best understood by reference to the following detailed description of illustrative embodiments when read in conjunction with the accompanying drawings, wherein.

DETAILED DESCRIPTION OF THE INVENTION

Figure 1:
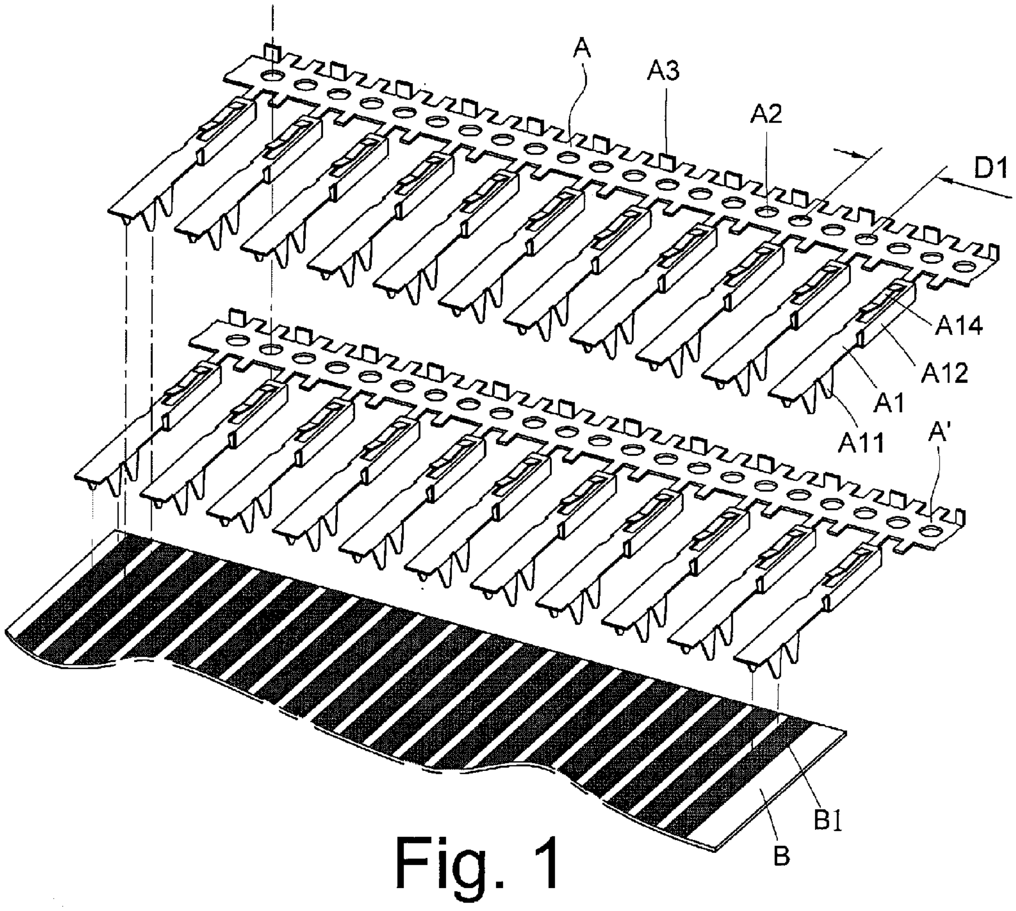
FIG. 1 shows continuous terminal bands with square-headed contacting sections spaced by 5.08 mm.

Referring to FIG. 5 through FIG. 8, the present invention provides an automatic feeding and crimping device equipped at a lower portion of a conventional terminal making machine P. The disclosed device has a base 1, a vertical sliding guide 11 fixed on a side of the base 1, a slider 12 settled in the vertical sliding guide 11 to be vertically movable and connected to a main shaft of the terminal making machine P, an upper crimping mold part 121 and upper cutter 122 fixed to a bottom of the slider 12, wherein the upper crimping mold part 121 has a downward surface provided with a plurality of spacing pins 1211, a lower mold part 123 deposited on the base 1 upward corresponding to the upper crimping mold part 121, wherein the lower mold part 123 has an upward face provided with a plurality of bend-guiding recesses 1231 for guiding piercing legs A11 to bend, and a cutter receiving surface 1221 deposited on the base 1 upward corresponding to the cutter 122.

Figure 7:
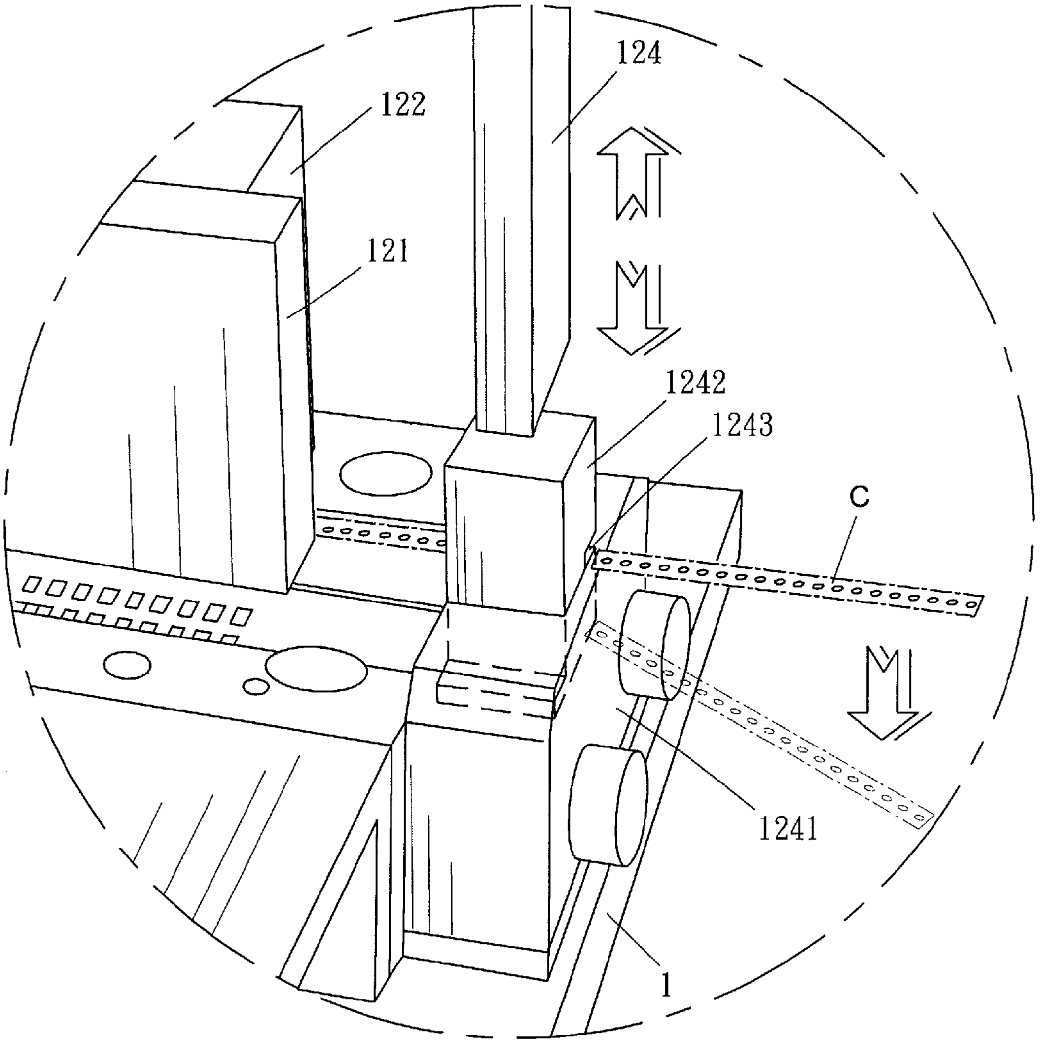
FIG. 7 is a partial, enlarged perspective view of the device of the present invention.
Figure 8:
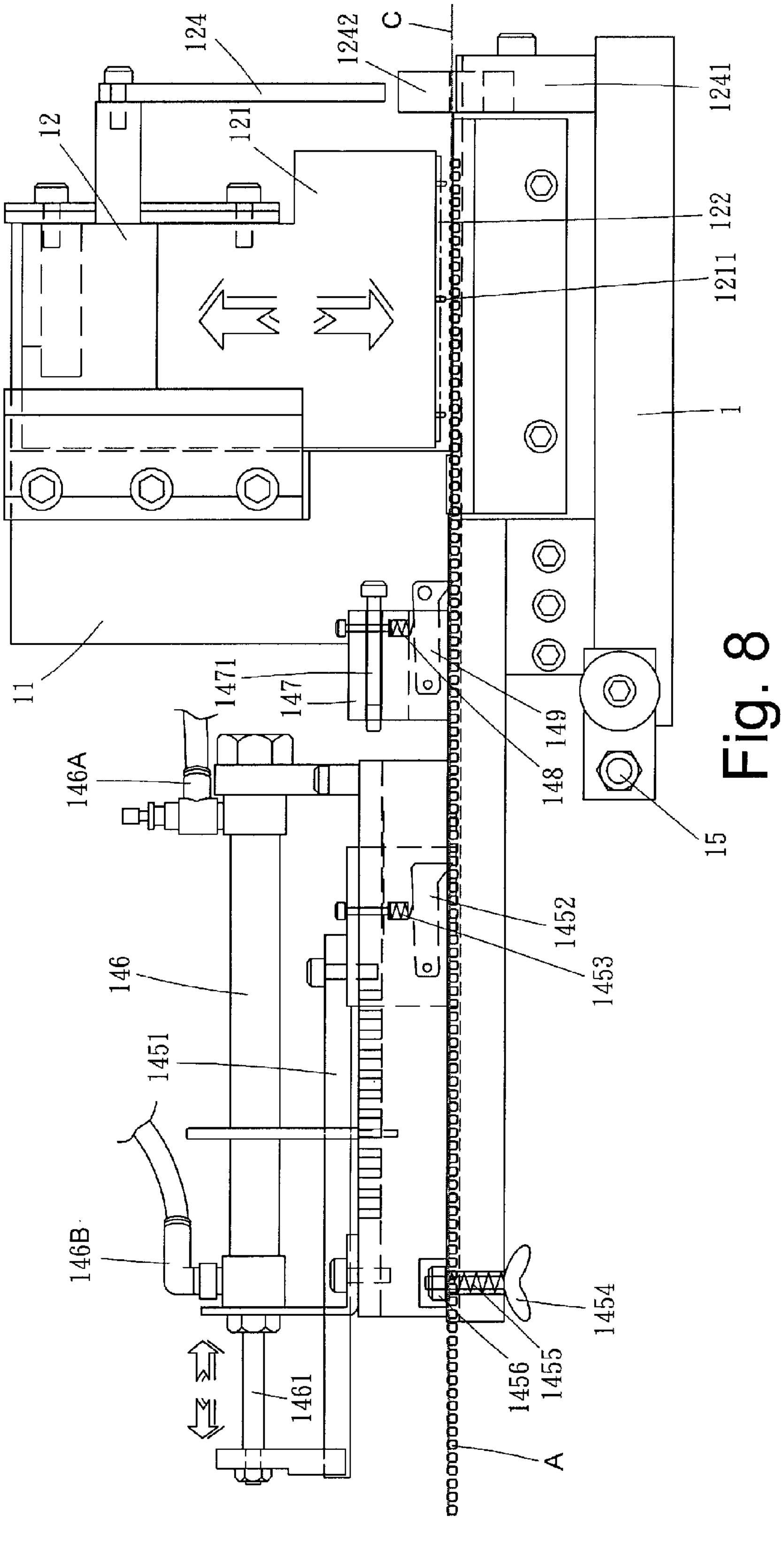
FIG. 8 is a side view of the device of the present invention.

As shown in FIG. 7, the slider 12 has one side fixed with a downward pusher 124. Below the downward pusher 124, there is a scrap chopper 1241 deposited on the base 1. The scrap chopper 1241 has a severing knife 1242 formed on waist a through hole 1243 that allows a scrap C to pass therethrough. Whenever the downward pusher 124 moves downward with the slider 12, it drives the severing knife 1242 to move downward and thereby sever the scrap equidistantly.

A guiding board 13 is attached to the base 1 beside the lower mold part 123 for allowing a flexible printed circuit/flexible flat cable B to be placed thereon. The guiding board 13 is equipped with an adjustable positioning aid 131. Near an opposite end of the base 1, a transverse plate 14 is formed on waist a feeding tunnel 141, which allows a continuous terminal band A to be inserted from one end thereof toward the upper crimping mold part 121. A rail 142 is mounted atop the transverse plate 14 and bilaterally formed with equidistant feeding pitch holes 143. Each of the feeding pitch holes 143 allows a feed setting post 144 to be inserted according to a desired number of terminals A1 to be fed. The rail 142 receives a feeding slider 145 sliding therein. The feeding slider 145 is connected to a shaft 1461 of a cylinder 146 fixedly deposited on the rail 142 through a driven rod 1451. Below the feeding slider 145, a positioning claw 1452 is settled in the feeding tunnel 141, and a spring coil 1453 is mounted on the positioning claw 1452. In its each backward travel, the feeding slider 145 touches and gets stopped by the feed setting post 144.

On an opposite end of the rail 142, there is a terminal-band crimping screw 1454, which comprises a spring 1455 and a crimping nut 1456, so that the tension of the fed continuous terminal band A can be manually adjusted, there by achieving precise positioning and preventing the terminals from going backward.

Figure 9:
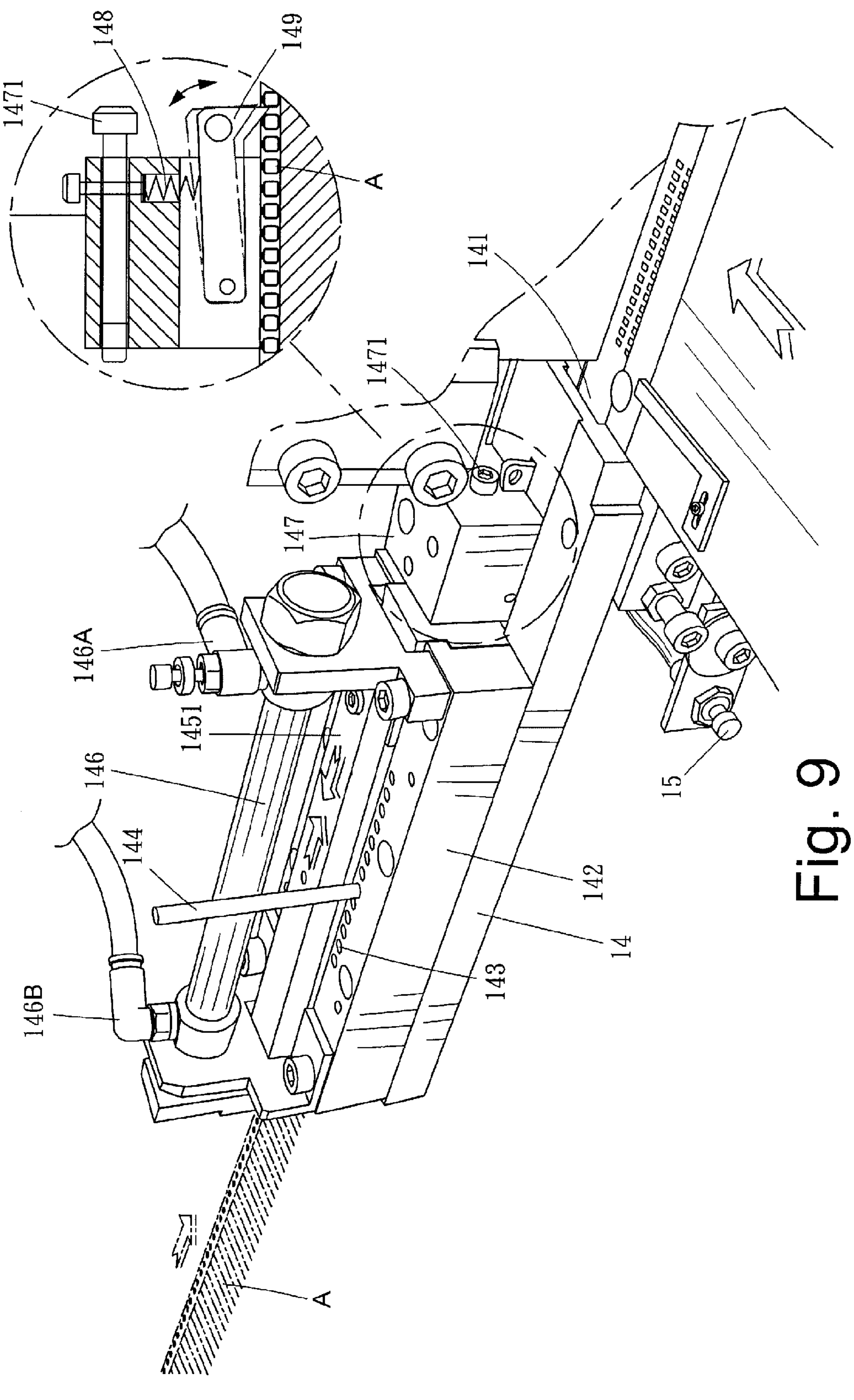
FIG. 9 is a partially enlarged schematic view of the device of the present invention.

As shown in FIG. 9, an anti-reverse seat 147 is mounted on the transverse plate 14 in front of the feeding slider 145. The anti-reverse seat 147 has its lower part equipped with a band retaining hook 149 that is set in the feeding tunnel 141 and controlled by a spring 148. The band retaining hook 149 serves to limit the terminals A1 to going forward and retain them from going backward. The anti-reverse seat 147 further comprises an adjusting bolt 1471 passing therethrough for fine adjustment of the forward movement of the feeding slider 145.

To specify, as known, in the crimping process, if full automatic feeding is adopted, it is likely that further terminals are fed before the crimped workpiece is removed, causing both the terminals and the workpiece to be damaged. Thus, manually-controlled feeding operated by a press button is preferred. In this case, after the workpiece is crimped, the subsequent terminals will not be fed until the workpiece is removed from the line and the press button is pressed, thereby minimizing loss. A feeding switch 15 is provided at a frontage of the base 1 and is electrically connected to a control circuit of the terminal making machine P. By pressing the feeding switch 15, the cylinder 146 is driven to slide backward to the feed setting post 144, and then slide forward to bring the terminals A1 of the set number forward.

Figure 6:
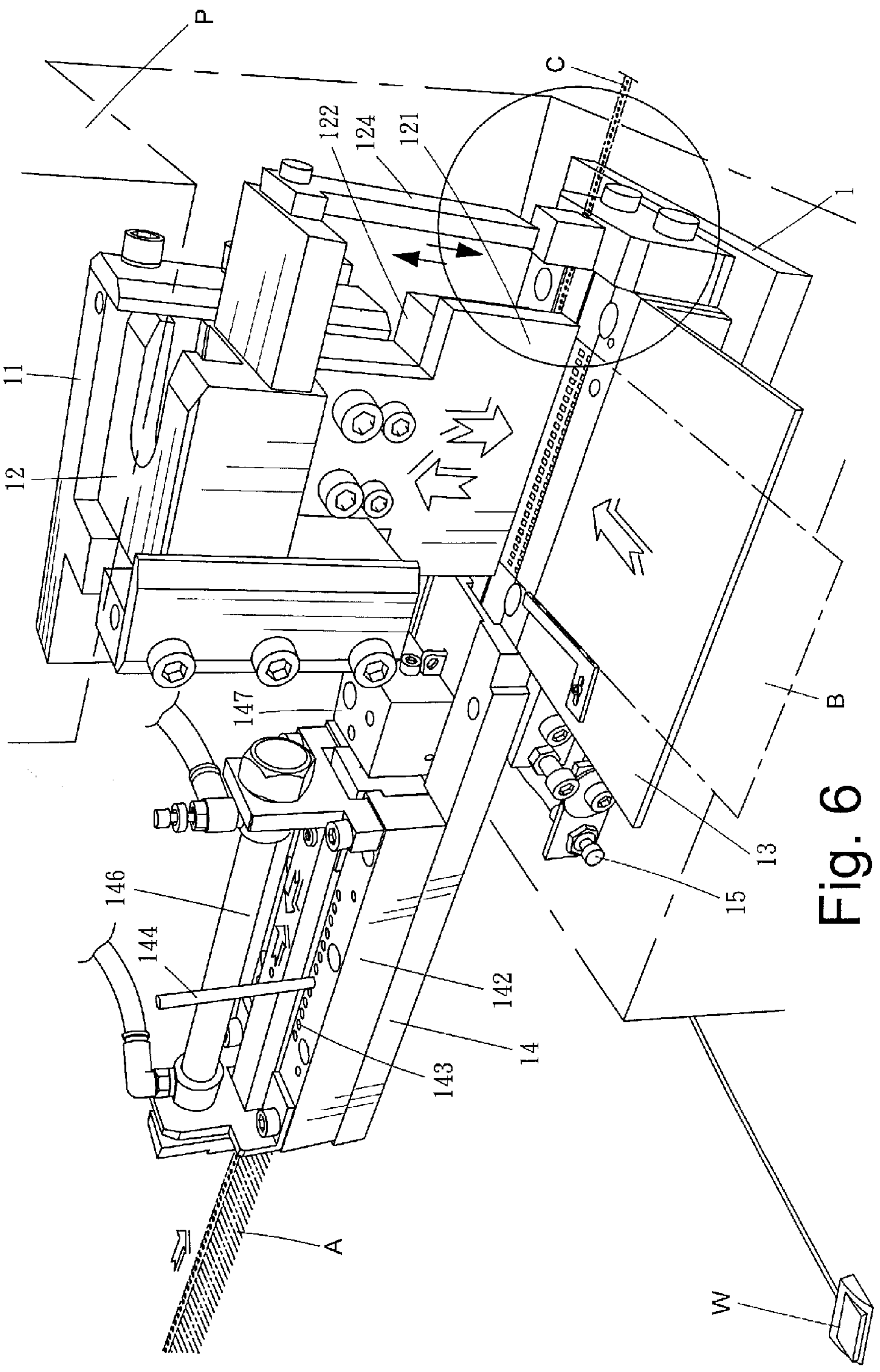
FIG. 6 is a schematic view of the device of the present invention.

Referring to FIG. 6, the terminal making machine P associated with the disclosed device is electrically connected to a pedal switch W. By stepping down the pedal switch W, the main shaft of the terminal making machine P pushes the slider 12 downward to a predetermined position for crimping the terminals A and the copper-foil/copper-wire connecting end B1 of the flexible printed circuit/flexible flat cable B, and then the slider 12 return upward to its standby position.

In use of the device, two continuous terminal bands A and A' that each have terminals A1 spaced by 5.08 mm and are offset stacked with each other are or a continuous terminal band A with terminals A1 spaced by 2.54 mm is placed into the feeding tunnel 141 of the transverse plate 14 so as to pass through the feeding slider 145, the anti-reverse seat 147 and the lower mold part 123. The scrap thereof then passes through the scrap severing unit 1241.

For performing the crimping process, the number of the terminals A1 to be combined with the flexible printed circuit/flexible flat cable B is first set, and the feed setting post 144 is inserted into the corresponding feeding pitch hole 143, such as the $13^{th}$ hole for a 13-pins flexible printed circuit/flexible flat cable. Afterward, by pressing the feeding switch 15, the control circuit makes compressed air enter an air-inlet tube 146A of the cylinder 146, so the feeding slider 145 inside the rail 142 of the transverse plate 14 is then driven to move backward and stop by the feed setting post 144. Following, the control circuit makes compressed air enter another air-inlet tube 146B of the cylinder 146, so the feeding slider 145 inside the rail 142 of the transverse plate 14 is driven to move forward while the positioning claw 1452 below the feeding slider 145 brings terminals A1 of the set number to moving forward and stopping on the lower mold part 123. At this time, the flexible printed circuit/flexible flat cable B is placed on the positioning aid 131 of the guiding board 13 so as to align with a front edge of the cutter 122.

Figure 2:
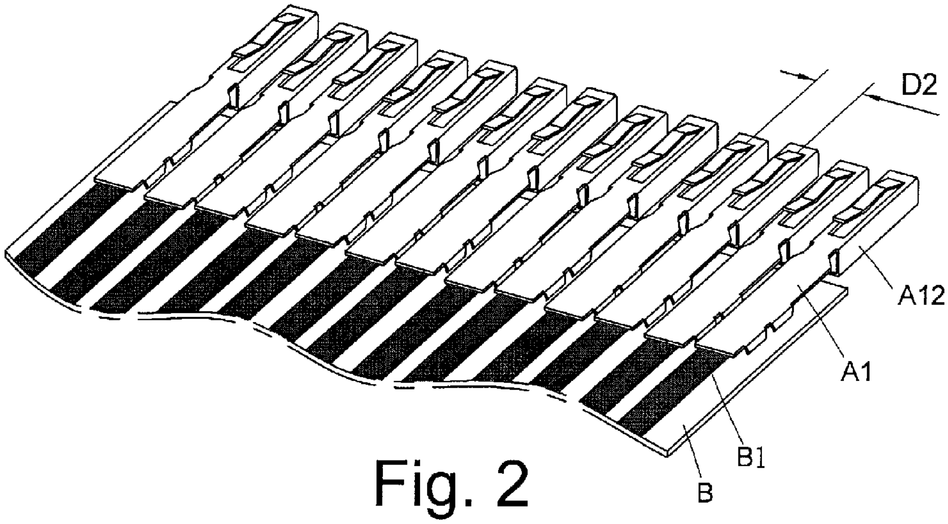
FIG. 2 is a perspective view of a finalized flexible printed circuit/flexible flat cable with the square-headed contacting sections according to the present invention.
Figure 3:
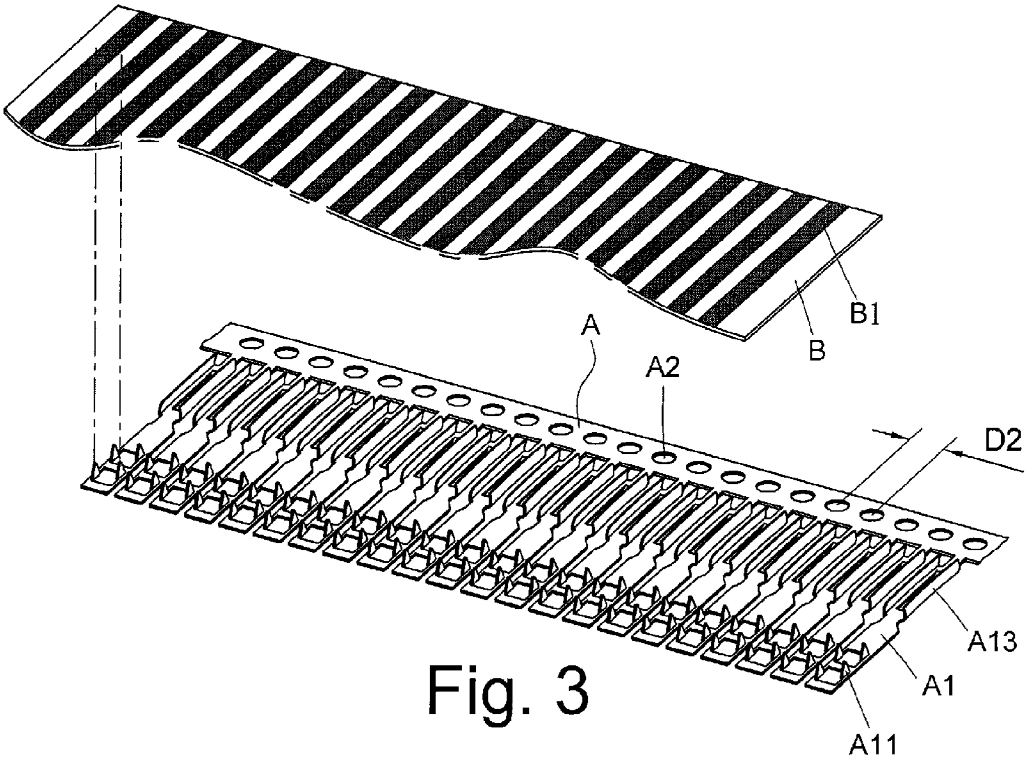
FIG. 3 shows a continuous terminal band with U-headed contacting sections spaced by 2.54 mm.
Figure 4:
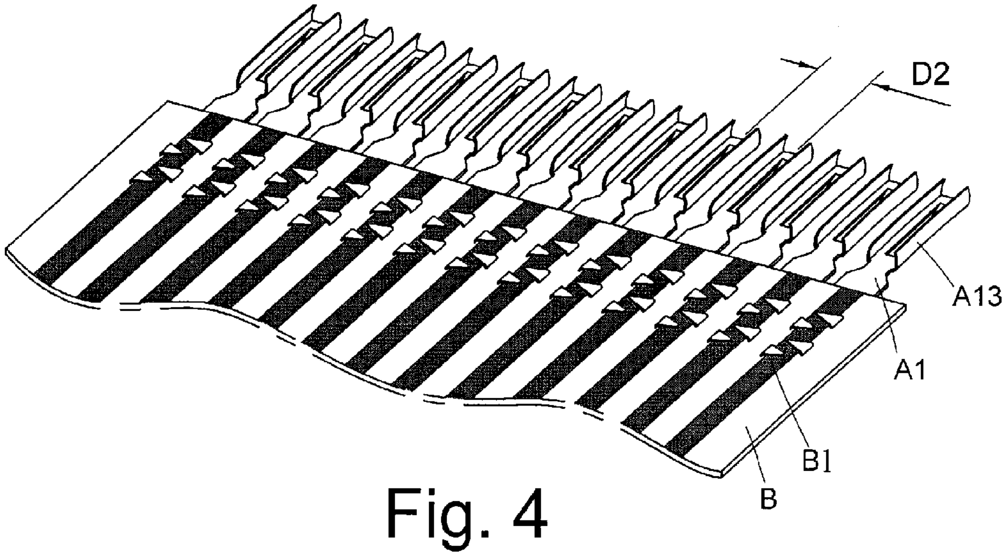
FIG. 4 is a perspective view of a finalized flexible printed circuit/flexible flat cable with the U-headed contacting sections according to the present invention.
Figure 5:
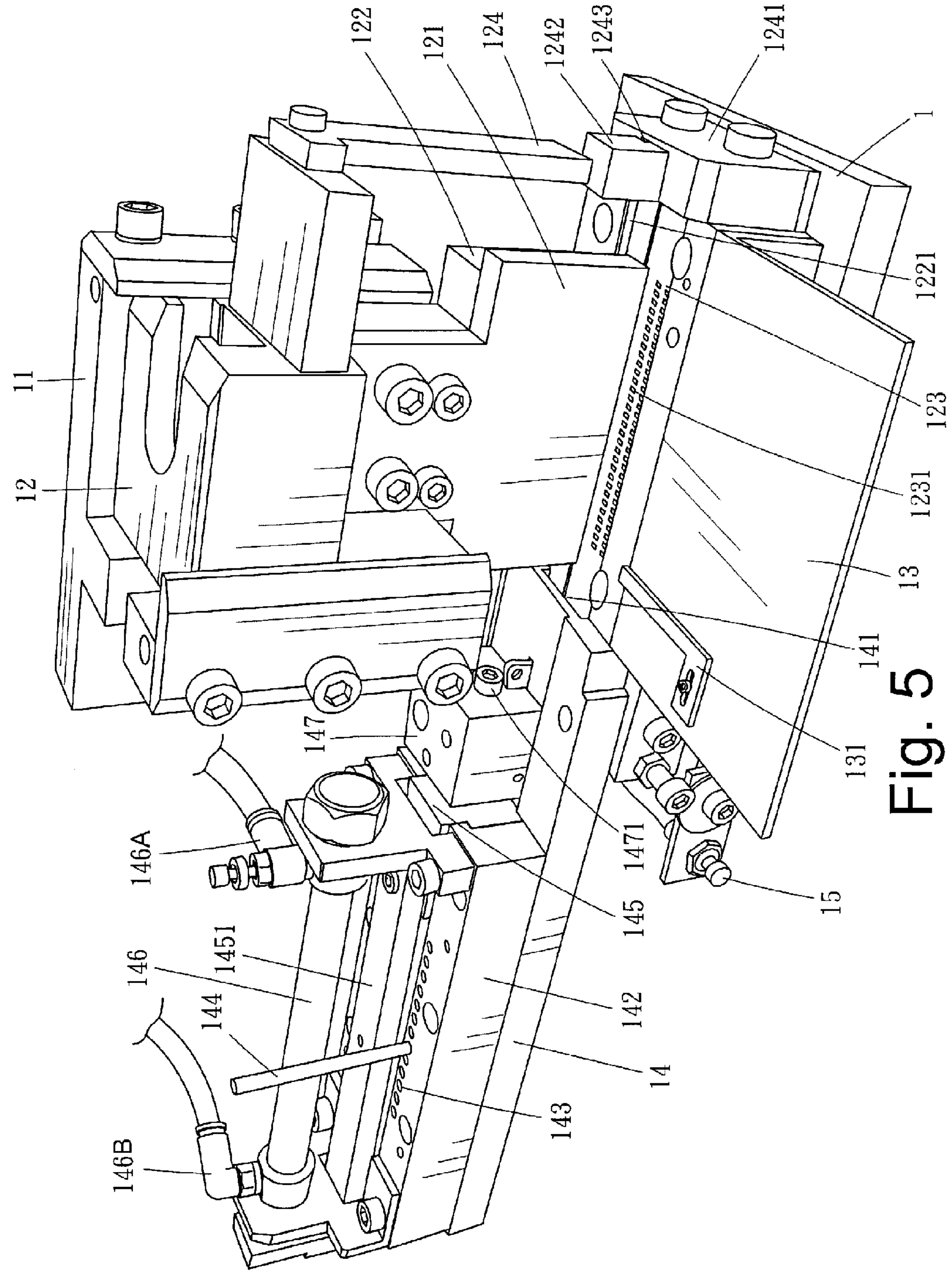
FIG. 5 is an applied view of the present invention installed on a terminal making machine.

Then, by stepping down the pedal switch W, the main shaft of the terminal making machine P pushes the slider 12 downward, and in turn pushes the upper crimping mold part 121 and the upper cutter 122 downward. Meantime, the spacing pins 1211 on the downward surface of the upper crimping mold part 121 pass through the pitch-setting holes A2 of the continuous terminal band(s) A (A, A') to well position the band(s) A (A, A') for crimping. Then, when the upper crimping mold part 121 and the upper cutter 122 move downward, the make piercing legs A11 of the terminal A1 precisely pierce through the copper-foil/copper-wire connecting end B1 of the flexible printed circuit/flexible flat cable B, and get bent in virtue of the bend-guiding recesses 1231 of the lower mold part 123 to grasp and electrically contact the copper-foil/copper-wire connecting end B1 of the flexible printed circuit/flexible flat cable B, as shown in FIG. 2 and FIG. 4.

The upper cutter 122 cooperates with the cutter receiving surface 1221 to cut the terminal A1 at a front edge of the square-headed contacting section A12 or U-headed contacting section A13, so as to disconnect the batch(es) of terminals A1 from the continuous terminal band A (A, A') and the scrap C. At the same time, the downward pusher 124 moves downward to push down the severing knife 1242 of the scrap severing unit 1241, thereby equidistantly chopping the scrap C passing the scrap severing unit 1241 into small pieces, for facilitating disposal and collection of the scrap.

After pushing the slider 12 to complete the above operation, the main shaft of the terminal making machine P moves upward to lift the slider 12 and return it to its standby position. Thereby, automatic, precise feeding of the terminals A1 and the one-step crimping process can be accomplished.

The bend-guiding recesses 1231 formed on the upward surface of the lower mold part 123 may be alternatively formed on the downward surface of the upper crimping mold part 121, so as to allow the continuous terminal band(s) A (A, A') to be fed reversely and receive the crimping process.

What is claimed is:

1. An automatic feeding and crimping device of an applicator in a terminal making machine for flexible printed circuits, flat cables and cable terminals, the automatic feeding and crimping device comprising:

a base 1 fixed below a vertically movable main shaft of the terminal making machine P;

a vertical sliding guide 11 deposited at one side of the base 1 for accommodating the slider 12 driven by the main shaft of the terminal making machine P to move vertically, wherein an upper crimping mold part 121 and an upper cutter 122 are provided below the slider 12, in which a lower mold part 123 is set on the base 1 upward corresponding to the upper crimping mold part 121, and a cutter receiving surface 1221 is set on the base 1 upward corresponding to the upper cutter 122;

a guiding board 13 being fixed to an opposite side of the base 1 beside the lower mold part 123 and configured to receive a flexible printed circuit/flexible flat cable B;

a downward pusher 124 being provided at one end of the slider 12, wherein a scrap severing unit 1241 is set on the base 1 upward corresponding to the downward pusher 124;

a transverse plate 14 being fixed to an end of the base 1 opposite to the guiding board 13, that transverse plate 14 being formed with a feeding tunnel 141 therein, a rail 142 being provided on the transverse plate 14, the rail 142 being bilaterally formed with equidistant feeding pitch holes 143, each said feeding pitch hole 143 allowing a feed setting post 144 to be selectively inserted therein according to a number of the terminals A1 desired to be fed at one time, the rail 142 being configured to receive a feeding slider 145, the feeding slider 145 being connected to a shaft 1461 of a cylinder 146 fixed on the rail 142 through a driven rod 1451, a positioning claw 1452 being provided below the feeding slider 145 and settled in the feeding tunnel 141, a spring coil 1453 being mounted on the positioning claw 1452, and the feeding slider 145, at an end of each backward travel thereof, touching and being stopped by the feed setting post 144;

a terminal-band crimping screw 1454 being provided at one end of the rail 142, and having a spring 1455 and crimping nut 1456, so that a tension of the continuous terminal band A is allowed to be manually adjusted, thereby preventing the continuous terminal band A from going backward with the positioning claw 1452 that is going backward;

an anti-reverse seat 147 being mounted on the transverse plate 14 in front of the feeding slider 145, the anti-reverse seat 147 having its lower part equipped with a band retaining hook 149 that is set in the feeding tunnel 141 and controlled by a spring 148, the anti-reverse seat 147 serving to limit the terminals A1 to going forward and retain the terminals A1 from going backward, and the anti-reverse seat 147 further comprising an adjusting bolt 1471 passing therethrough for fine adjustment of the forward movement of the feeding slider 145;

a feeding switch 15 being provide on a frontage of the base 1 and configured to activate the cylinder 146 to slide backward to the feed setting post 144 and then slide forward to bring the terminals A1 of the set number forward; and a pedal switch W being electrically connected to the terminal making machine P, and being configured to, when stepped down, make the main shaft of the terminal making machine P drive the slider 12 to move downward to a predetermined position and then lift the slider 12 back to a standby position of the slider 12.

2. The automatic feeding and crimping device of claim 1, the scrap severing unit 1241 has a severing knife 1242 formed with a through hole 1243 that allows the through hole 1243 a scrap C to pass, so that when the downward pusher 124 moves downward with the slider 12, the severing knife 1242 is driven to sever the scrap equidistantly.

3. The automatic feeding and crimping device of claim 1, wherein the feeding tunnel 141 of the transverse plate 14 is configured to allow two said continuous terminal bands A and A' that each have the terminals A1 spaced by 5.08 mm and are offset stacked with each other or a single said continuous terminal band A with terminals A1 spaced by 2.54 mm or 1.27 mm to be placed into one end of the feeding tunnel 141 of the transverse plate 14 so that the terminal bands A and A' or the terminal A then passes the anti-reverse seat 147 and the lower mold part 123, and a scrap C of the terminal bands A and A' or the terminal A then passes the scrap severing unit 1241.

4. The automatic feeding and crimping device of claim 1, wherein a plurality of spacing pins 1211 are provided on a downward surface of the upper crimping mold part 121.

5. The automatic feeding and crimping device of claim 1, wherein the lower mold part 123 has an upward surface provided with a plurality of bend-guiding recesses 1231 for guiding piercing legs A11 of the terminal A to bend.

6. The automatic feeding and crimping device of claim 5, wherein the bend-guiding recesses 1231 on the upward surface of the lower mold part 123 are alternatively set on a downward surface of the upper crimping mold part 121, so as to allow the continuous terminal band(s) A (A, A') to be fed reversely and receive the crimping process.

7. The automatic feeding and crimping device of claim 1, wherein the guiding board 13 is equipped with an adjustable positioning aid 131, so that when the flexible printed circuit/flexible flat cable B is placed on the positioning aid 131 of the guiding board 13, a front edge of the guiding board 13 is aligned with a front edge of the cutter 122.

8. The automatic feeding and crimping device of claim 1, wherein the feed setting post 144 is selectively inserted into one of the feeding pitch holes 143 according to numbers of the flexible printed circuit/flexible flat cable B and the terminals A1 to be crimped.

9. The automatic feeding and crimping device of claim 1, wherein the feeding switch 15 is connected to a control circuit of the terminal making machine P, so that by pressing the feeding switch 15, compressed air is supplied to an air-inlet tube 146A of the cylinder 146 to drive the feeding slider 145 in the rail 142 of the transverse plate 14 to move backward and get stopped by the feed setting post 144 inserted into the feeding pitch hole 143 related to the number of the terminals A1 desired to be fed at one time, and then compressed air is supplied to another air-inlet tube 146B of the cylinder 146 to drive the feeding slider 145 in the rail 142 of the transverse plate 14 to move forward, while the positioning claw 1452 below the feeding slider 145 brings the terminals A1 of the set number forward to make the terminals A1 stop on the lower mold part 123.

10. The automatic feeding and crimping device of claim 1, wherein the slider 12 of the vertical sliding guide 11 and the upper crimping mold part 121 and the upper cutter 122 fixed to the slider 12, when the upper crimping mold part 121 slide downward, make piercing legs A11 of the terminal A1 precisely pierce through a copper-foil/copper-wire connecting end B1 of the flexible printed circuit/flexible flat cable B, the piercing legs A11 then being bent in virtue of bend-guiding recesses 1231 of the lower mold part 123 to grasp and electrically contact the flexible printed circuit/flexible flat cable B, the upper cutter 122 cooperating with the cutter receiving surface 1221 to cut the terminal A1 at a front edge of a square-headed contacting section A12 or a U-headed contacting section A13 of the terminal A1, so as to disconnect the terminals A1 from the continuous terminal band(s) A (A, A'), and, at the same time, the downward pusher 124 moving downward to push down a severing knife 1242 of the scrap severing unit 1241 so that the severing knife 1242 equidistantly chops the scrap C passing the scrap severing unit 1241 into small pieces, for facilitating disposal and collection of the scrap, whereby automatic, precise feeding of the terminals A1 and a one-step crimping process are accomplished.

* * * * *